United States Patent
Horowitz et al.

(10) Patent No.: US 12,455,274 B2
(45) Date of Patent: Oct. 28, 2025

(54) METHOD FOR DETERMINING THE PROVENANCE OF AN OIL SAMPLE USING GEOCHEMICAL ALLOCATION

(71) Applicant: YPF TECNOLOGÍA S.A., Ciudad Autónoma de Buenos Aires (AR)

(72) Inventors: Gabriel Ignacio Horowitz, Ciudad Autónoma de Buenos Aires (AR); Martín Fasola, Ciudad Autónoma de Buenos Aires (AR); Romina Milicich, Ciudad Autónoma de Buenos Aires (AR); Ricardo Maronna, Ciudad Autónoma de Buenos Aires (AR); Santiago Wiedmann, Ciudad Autónoma de Buenos Aires (AR)

(73) Assignee: YPF TECNOLOGÍA S.A., Ciudad Autónoma de Buenos Aires (AR)

( * ) Notice: Subject to any disclaimer, the term of this patent is extended or adjusted under 35 U.S.C. 154(b) by 315 days.

(21) Appl. No.: 17/958,135

(22) Filed: Sep. 30, 2022

(65) Prior Publication Data

US 2023/0104694 A1   Apr. 6, 2023

Related U.S. Application Data

(60) Provisional application No. 63/251,268, filed on Oct. 1, 2021.

(51) Int. Cl.
*G01N 33/24* (2006.01)
*G01N 30/86* (2006.01)

(52) U.S. Cl.
CPC .......... *G01N 33/241* (2013.01); *G01N 30/86* (2013.01)

(58) Field of Classification Search
CPC ................. G01N 33/241; G01N 30/86; G01N 2030/8854
See application file for complete search history.

(56) References Cited

U.S. PATENT DOCUMENTS

| | | | |
|---|---|---|---|
| 2018/0313807 A1 | 11/2018 | Michael et al. | |
| 2019/0219558 A1* | 7/2019 | Villar De Andrade E Silva | G01N 33/2823 |
| 2021/0181117 A1* | 6/2021 | Casey | G01N 27/62 |
| 2023/0118696 A1* | 4/2023 | Sauerer | G01N 21/65 356/301 |
| 2024/0136166 A1* | 4/2024 | Kuehl | G16B 35/10 |

FOREIGN PATENT DOCUMENTS

WO   WO-2022178507 A1 * 8/2022 ............. G06N 3/045

OTHER PUBLICATIONS

Pasadakis et al., Classification of Gasoline Grades Using Compositional Data and Expectation—Maximization Algorithm, 2007, Energy & Fuels, 21, pp. 3406-3409 (Year: 2007).*
English translation of CN 114235984A to Li-rong Gao et al. (Year: 2021).*

* cited by examiner

*Primary Examiner* — Mi'Schita' Henson
(74) *Attorney, Agent, or Firm* — MUNCY, GEISSLER, OLDS & LOWE, P.C.

(57) ABSTRACT

A method for determining the geological levels of reservoirs contributing to a sample from a produced oil well, by means of chromatographic composition data, as well as other characteristics of the produced oil and pure samples of oil originating from each of the different geological levels contributing to the sample. The method provided by the invention may be advantageously implemented in a computer.

9 Claims, 1 Drawing Sheet

METHOD FOR DETERMINING THE PROVENANCE OF AN OIL SAMPLE USING GEOCHEMICAL ALLOCATION

CROSS REFERENCE TO RELATED APPLICATIONS

This application claims priority of U.S. Provisional Application No. 63/251,268 filed on Oct. 1, 2021 under 35 U.S.C. § 119(e), the entire contents of which are hereby incorporated by reference.

TECHNICAL FIELD

The present invention generally relates to the field of oil production processes. Specifically, the present invention relates to methods and devices for determining the provenance of oil samples.

BACKGROUND

Perforation of vertical wells is carried out to produce oil and gas. During these operations, the produced hydrocarbon has been frequently originated in several different geological levels, such that it comprises a mixture of hydrocarbons generated in each of these different levels. Further, the contribution from each level to the total produced hydrocarbon flow rate may vary in time. Therefore, the knowledge of the contribution from each level is important for adequate well management in primary, secondary, and tertiary production processes.

In the case of a horizontal well (the FIGURE) that has been navigated and stimulated in a single particular geological level, it is critical to determine whether the well is effectively producing hydrocarbons from that particular level or has suffered interference, in order to produce the whole stimulated area and define completion strategies, as well as identifying drained-out areas and other relevant characteristics for the operation of an active well site.

Information on geological level is therefore of crucial importance for monitoring the production of both vertical and horizontal wells.

Several direct and indirect techniques are known for obtaining such geological level information, such as microseismic monitoring during a hydraulic fracture process, monitoring of pressure and tracers injected during production in order to evaluate well communication and fracture network connectivity, Production Logging Tools (PLTs), and geochemical allocation.

Geochemical allocation of the provenance of an oil sample comprising hydrocarbons potentially originated in different geological levels is usually carried out by comparing analyses of the unknown oil sample with analyses of known oil samples obtained from pure, identified geological levels, i.e "end members". These analyses may be carried out for hydrocarbons extracted from rocks samples, e.g. side core and drill cutouts as well as in production fluids, e.g. oil, gas and water. However, in cases where the wells were drilled using oil-based mud, organic compounds from the drilling mud could interfere with the solution of the unknown samples. In this case, the analysis must be carried out using produced oils and its results are independent of interference from the mud.

Analyses carried out in samples may comprise composition of salts, inorganic and organic elements or other compounds. Measuring techniques include capillary gaseous chromatography combined with a flame ionization detector (GC-FID). This technology has been applied to geochemical fingerprinting of unconventional, shale-type oil reservoirs (see, e.g., Baskin et al. 2013).

US 2018/0313807 A1 discloses such techniques employing chromatographic analysis, either with or without combining it with other types of analyses, in order to determine the provenance levels of an oil sample.

The methods of the prior art rely on chemical and geochemical knowledge for solving the systems of equations involved in the allocation techniques, thereby requiring increased calculation times and resources.

There is therefore a need to provide a method for determining the provenance of a crude oil sample using geochemical allocation that does not require prior chemical and geochemical knowledge to carry out the necessary calculations, and that can provide results with increased accuracy and decreased resource consumption.

SUMMARY

The present invention provides a method to determine the geological levels or reservoirs contributing to a sample from a produced oil well. To this end, chromatographic composition data, as well as other characteristics of the produced oil and pure samples of oil originating from each of the different geological levels contributing to the sample. The method provided by the invention may be advantageously implemented in a computer.

To that end, a first object of the present invention is a computer-implemented method for determining the provenance of an unknown sample obtained from production of a well, the method comprising the steps of:
a) collecting a plurality of samples from different geological levels in the reservoir,
b) determining the value of a set of properties in each of the samples collected in step a),
c) determining a value of the same properties in the unknown sample, and
d) calculating a contribution of each geological level to the unknown sample, by solving a system of equations relating the values of the properties in each of the samples collected in step a) determined in step b) to the value of the properties in the sample determined in step c) using linear discriminant analysis.

In a preferred embodiment, the linear discriminant analysis comprises calculating a set of eigenvalues and eigenvectors generating a hyperplane wherein the ratio of intra covariances and inter covariances is maximal. More preferably, the intra covariance matrix and the inter covariance matrix are respectively defined by the following equations:

$$\Sigma_b = \sum_{k=1}^{K}(\mu_k - \mu)N_k(\mu_k - \mu)^T$$

$$\Sigma_w = \sum_{k=1}^{K}\sum_{n=1}^{N_k}(X_n^{(k)} - \mu_k)(X_n^{(k)} - \mu_k)^T$$

and the eigenvectors are defined by the following equation:

$$\Sigma_w^{-1}\Sigma_b w = \lambda w.$$

In a preferred embodiment, solving the system of equations comprises maximizing a cost function. Preferably, the cost function is defined by the following equation:

$$J(w) = w \cdot \Sigma_b \cdot w^T / w \cdot \Sigma_w \cdot w^T$$

More preferably, maximizing the cost function comprises solving the following equation:

$$\Sigma_w^{-1}\Sigma_b w = (w \cdot \Sigma_b \cdot w^T / w \cdot \Sigma_w \cdot w^T) w$$

In preferred embodiments, determining the values of properties comprise subjecting the samples of oil core to a gas chromatography or other analysis like analysis to determine mass fraction values.

Analyses carried out in samples may comprise composition of salts, inorganic elements or other compounds. Measuring techniques include capillary gaseous chromatography combined with a flame ionization detector (GC-FID).

Another object of the present invention is a computer-implemented method for determining the provenance of a sample obtained from production of a well, the method comprising the steps of:
a) collecting a plurality of samples from different geological levels in the reservoir,
b) determining the value of a set of properties in each of the samples collected in step a),
c) determining a value of the same properties in the unknown sample, and
d) calculating a contribution of each geological level to the unknown sample, by solving a system of equations relating the values of the property in each of the samples collected in step a) determined in step b) to the value of the property in the sample determined in step c) using maximum likelihood estimation.

A further object of the present inventions is a computer-readable medium encoded with instructions that, when executed, perform operations for determining the provenance of a sample obtained from production of a well, the operations comprising:
a) collecting a plurality of samples from different geological levels in the reservoir,
b) determining the value of a set of properties in each of the samples collected in step a),
c) determining a value of the same properties in the unknown sample, and
d) calculating a contribution of each geological level to the unknown sample, by solving a system of equations relating the values of the properties in each of the samples collected in step a) determined in step b) to the value of the properties in the sample determined in step c) using linear discriminant analysis.

Yet another object of the present invention is a computer-readable medium encoded with instructions that, when executed, perform operations for determining the provenance of a sample obtained from production of a well, the operations comprising:
a) collecting a plurality of samples from different geological levels in the reservoir,
b) determining the value of a set of properties in each of the samples collected in step a),
c) determining a value of the same properties in the unknown sample, and
d) calculating a contribution of each geological level to the unknown sample, by solving a system of equations relating the values of the property in each of the samples collected in step a) determined in step b) to the value of the property in the sample determined in step c) using maximum likelihood estimation.

BRIEF DESCRIPTION OF THE FIGURES

The FIGURE shows a simplified schematic of an unconventional reservoir. Three wells are observed in production, two of which are "end members", producing crude from a single geological layer, and a third one that has interferences, producing crude from different geological layers. In the drawing, the volume of rock stimulated in each well is shown as an area crossed by vertical lines that symbolize the fractures. The length of the fracture lines shows that in the well from which the unknown sample is drawn in the example, the fractures cross two different levels. As can be seen, in well 2, the stimulated zone spans two levels.

Label 1 Depicts an end member, a well that produces oil from a single geological layer.

Label 2 shows a well potentially producing oil from two geological layers.

Label 3 describes the different geological layers from which oil can be produced.

DETAILED DESCRIPTION

Figure 1:
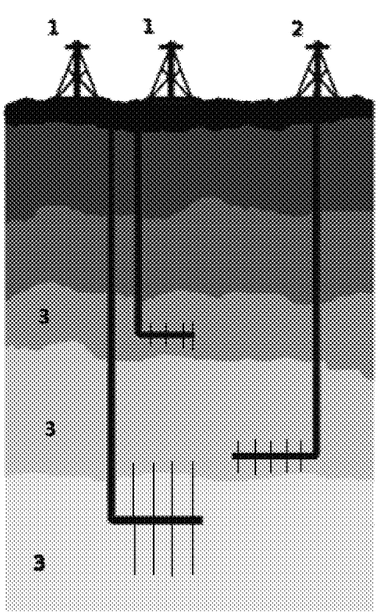

The invention will be described in further detail below and illustrated by non-limiting examples of specific embodiments.

The term "geochemical allocation" as used herein and applied to a hydrocarbon sample, i.e. an oil sample, production water or a gas sample, refers to the determination of the provenance of that sample, in terms of the contribution of different geological levels to the mixture of hydrocarbons comprised in the sample.

As used herein, the term "geological level", or interchangeably "reservoir", refers to a region within a rock formation contributing to the overall flow of produced hydrocarbons, i.e. oil and gas. In the context of the invention, the contribution of each level determines the hydrocarbon mixture that is produced from a well or a plurality of wells, and that will therefore be present in the sample.

The term "linear discriminant analysis" refers to techniques used to find a linear combination of features that characterizes or separates two or more classes of objects or events. Numerical methods for implementing these techniques in a computer-readable medium by solving a set of equations are described in further detail below.

The present invention discloses methods to determine the effective drained vertical and lateral volumes from horizontal wells in a shale reservoir. These volumes may be used to determine production allocation, which may be used in reservoir modeling to optimize well placement, resulting in optimized oil production and recovery factors in an unconventional, shale-type reservoir.

The invention advantageously provides an improved usage of the data available from oil chromatography (GC-FID) and other analysis performed to water gas and rock samples taken from the well, since it is not based on the manual selection of a group of measured properties or their ratios. The invention uses all the available geochemical data and uses an optimal estimation, as will be described in further detail below.

It may be shown that, for two geochemical properties (e.g. chromatographic peaks), the accuracy of results obtained using the methods of the prior art, such as the method disclosed in US 2018/0313807 A1, represent a lower bound of the accuracy obtained using the method provided by the present invention.

In addition, the method provided by the invention optimizes data processing, since it does not require any previous geochemical knowledge. The method is based on the available information in a series of well samples, each originating from one of the geological levels which potentially contribute to the mixture in the sample under analysis. In that sense, the proposed method is a data-based method.

The present invention provides a method to determine geological level or reservoirs contributing to a crude oil being produced from an oil well. To this end, data from the crude oil water or gas being produced, as well as from pure crude oil, gas or water samples of each of the levels contributing to an unknown sample are used.

The method comprises collecting samples from each of the potentially contributing geological levels and determining composition in each of these samples. The analyzes performed on the samples may include composition of salts or inorganic and organic elements or other compounds, high-resolution capillary chromatography with FID detector (GC-FID) is a central part of these determinations. The samples may be taken from the oil itself, from the co-produced gas and/or water or even from rock extracts obtained from these levels, such as side core and drill cutouts. During the sampling process, sample contamination must be avoided, as well as contamination of the samples representative of each level with oil originating from another level.

The method provided by the invention uses the heterogeneity in physicochemical properties and composition that are measured and calculated both for samples corresponding to the pure known levels, as well as for the oil, water or gas mixture in the sample.

The method uses properties that follow the linear additivity rule, expressed in equation (1) below:

$$y_{mixture} = x_1 y_1 + x_2 y_2 + \ldots + x_n y_n \quad (1)$$

wherein $y_{mixture}$ is the property measured on the sample crude oil gas or water, i.e., comprising the mixture, $x_i$ is the mass fraction of the oil in level i in the mixture and $y_i$ is the value of said property in the crude oil gas or water sample from level i, i.e. in the level i "pure" sample. In the case of a composition analysis, such as obtained from a chromatographic analysis of the crude oils, $y_i$ may be the mass fraction of a given component in the crude oil of level i.

Therefore, in this case, the "contribution" of each geological level to the mixture is equivalent to the value of the "weighting factor" of the property, in this case the mass fraction, of the oil in that geological level in the mixture.

In the case of a single property measured in the crude oil samples and two levels contributing to the crude oil mixture, $x_2 = 1 - x_1$ and equation (1) becomes:

$$y_{mixture} = x_1 y_1 + (1 - x_1) y_2 \quad (2)$$

The value of $x_1$ may be readily calculated from equation (2), so that the contribution of each level, in terms of a mass fraction, may be expressed as:

$$x_1 = y_{mixture} - y_2 / (y_1 - y_2) \quad (3)$$

In case more properties or concentrations of several compounds in each crude oil are available, an equation similar to equation (1) is formulated for each measured property or concentration. In this case, the mass fractions of crude oil in each level ($x_1$) will be the same in all equations, and the properties of each level ($y_i$) will be variable for each equation.

Therefore, the problem to be solved can be expressed as a system of equations with as many equations as properties or concentrations that have been measured in the contributing levels and in the mixture and as many unknowns as potentially contributing levels are present in the system. A further equation, stating that the mass fractions contributed by each level must add up to one, is added to the system of equations. The corresponding system of equations is shown as equation (4) below:

$$y^{(1)}_{mixture} = x_1 y_1^{(1)} + x_2 y_2^{(1)} + \ldots + x_n y_n^{(1)} \quad (4)$$

$$y^{(2)}_{mixture} = x_1 y_1^{(2)} + x_2 y_2^{(2)} + \ldots + x_n y_n^{(2)}$$

$$\ldots$$

$$y^{(m)}_{mixture} = x_1 y_1^{(m)} + x_2 y_2^{(m)} + \ldots + x_n y_n^{(m)}$$

$$\sum_{i=1}^{n} x_i = 1$$

wherein the superscript of each equation denotes the measured property corresponding to each equation.

In the methods of the prior art, the system of equations comprises more equations than unknowns and is solved by searching the set of contributing mass fractions that best approximates the system of equations represented in (4). Since this system is overdetermined, i.e. comprises more equations than unknowns, the obtained solution is approximate.

Ratios between the measured properties are usually considered in addition to the properties measured for each level. Using ratios increases the size of the set of properties and therefore increases the number of equations, and in most cases improves the obtained results. On the other hand, the use of ratios may alter the linear additivity relation of equation (1). This aspect will be discussed in further detail below.

The main drawbacks of the prior art are related to properties selection and ratios thereof that allow calculating the contribution of each level to the mixture crude oil with greater accuracy. This is dependent on the relationship between the values for each property in the different contributing levels, as well as in the variance and covariance of these measured properties.

In the prior art, the variables are selected according to the best signal-to-noise ratio (SNR) based on geological or analytical knowledge. For example, when compositions of crude oil samples are measured in a gaseous chromatography, compositions of the most volatile components are usually discarded, since they may vary due to selective evaporation during sample handling and/or storage. This fractioning may even take place during production. Therefore, in the prior art, the knowledge of the chemical properties of all compounds are used to generate ratios and groupings of chemically similar compounds, in order to overcome this problem.

The noise may have an analytical origin, related to the limitations of the equipment used to measure the properties and geological provenance. In the methods of the prior art, it is necessary to dedicate resources to quantifying the noise in order to select the best properties and ratios to carry out the analysis.

With regards to including ratios between properties or mass fractions of compounds determined by gaseous chromatography or other methods, these will follow the linear additivity rule if the value of the property in the ratio denominator is similar for every oil contributing to the sample.

As an example, it may be shown that the relative error in the determination of the mixture due to non-compliance with the linear additivity rule in the ratios for two contributing levels $C_1$ and $C_2$ and one ratio is:

$$(C_1-C_2)=y_1/x_1-y_2/x_2 \quad (5)$$

Raised the difference $\Delta(C_1-C_2)$ between the contributing levels $C_1$ and $C_2$ is given by:

$$\Delta(C_1-C_2)=d/dy_1(y_1/x_1-y_2/x_2)\Delta y_1+d/dx_1(y_1/x_1-y_2/x_2)\Delta x_1+d/dy_2(y_1/x_1-y_2/x_2)\Delta y_2+d/dx_2(y_1/x_1-y_2/x_2)\Delta x_2 \quad (6)$$

Working out the algebra one obtains the simplified formula for the difference:

$$\Delta(C_1-C_2)=\Delta y_1/x_1+\Delta y_2/x_2+\Delta x_1\Delta y_1/x_1^2+\Delta x_2\Delta y_2/x_2^2 \quad (7)$$

Finally, the relative error $\Delta(C_1-C_2)/(C_1-C_2)$ is given from the below expression:

$$\Delta(C_1-C_2)/(C_1-C_2)=(\Delta y_1/x_1+\Delta y_2/x_2+\Delta x_1\Delta y_1/x_1^2+\Delta x_2\Delta y_2/x_2^2)/(y_1/x_1-y_2/x_2) \quad (8)$$

The prior art addressed the issues above by using chemical and geochemical knowledge. Instead, the present invention advantageously uses the data itself. To that end, instead of selecting a set of properties having the best signal noise ratio (SNR), several measurements of different crude samples from each contributing level are carried out, and the linear discriminant analysis or maximum likelihood method technique are used to choose the projection that best separates the contributing levels. These techniques are based exclusively on the covariance matrix of the measured data and does not require any chemical or geochemical knowledge, apart from the one necessary for ensuring the quality and reproducibility of the results.

In this manner, the time and expert knowledge needed to complete the task are significantly lower than those required in the methods of the prior art.

It can be easily shown for a simple example and using the same variables in both methods, that the value obtained by using the methods disclosed in the prior art result in a worse or equal estimation compared to the one obtained using the methods disclosed herein.

Maximum Likelihood Estimation The following is a proposed development based on the maximum likelihood technique to solve the n-level allocation problem. There are K populations in $R^d$, with multivariate distributions $G_k$ (k=1, ..., K) that are assumed to be known, which can be thought as the distributions described by the end members from different geological layers. There is a random vector $\alpha$ of which it is known that the $\alpha_k$ are independent, where $\alpha$ is the vector that represents the contribution proportions of each geological layer, mathematically we seek to estimate $\alpha$ as a function of y where y is the vector that represents an unknown mixture:

$$y=\Sigma_{k=1}^{K}\alpha_k y_k \quad (9)$$

Where the $y_k$ are independent, $y_k$ has a $G_k$ distribution and the $\alpha$ fulfill the condition:

$$\alpha\in[0,1], \Sigma_{k=1}^{K}\alpha_k=1 \quad (10)$$

As a first approximation, it is assumed that the distributions $G_k$ are multivariate normal with vectors of means $\mu_k$, and the same covariance matrix $\Sigma$, then the vector y is a multivariate normal with vector of means $\mu_\alpha$ and covariance matrix $\Sigma_\alpha$:

$$\mu_\alpha=\Sigma_{k=1}^{K}\alpha_k\mu_k \quad (11)$$

$$\Sigma_\alpha=c_\alpha\Sigma \quad (12)$$

$$c_\alpha=\Sigma_{k=1}^{K}\alpha_k^2 \quad (13)$$

$\alpha$ is estimated by maximum likelihood. The likelihood function in this case is the density of y:

$$f_\alpha(y)=1/(2^{m/2}\det(\Sigma_\alpha))\exp[(\tfrac{1}{2})(y-\mu_\alpha)^T\Sigma_\alpha^{-1}(y-\mu_\alpha)] \quad (14)$$

the estimated $\hat{\alpha}=\hat{\alpha}(y)$ is the value such that:

$$f_\alpha=\max, \alpha\in A \quad (15)$$

The derivative of the likelihood function results in a nonlinear equation of which no explicit solutions can be obtained. This equation can be solved numerically, but in order to obtain the standard deviations of the estimator, an explicit solution is required. Therefore, the problem is simplified by replacing $\Sigma_\alpha$ by $\Sigma$:

$$Q(\alpha)=\min, \alpha\in A \quad (16)$$

$$Q(\alpha)=(y-\mu_\alpha)^T\cdot\Sigma^{-1}\cdot(y-\mu_\alpha) \quad (17)$$

Let $\gamma_k=\mu_k-\mu_K$, and let $\Gamma$ be the matrix of (K-1)×m with elements: $\gamma_{kj}$ (k=1, ..., K-1, j=1, ..., m). Then $$\mu_\alpha=\mu_m+\Sigma_{k=1}^{K}\alpha_k\gamma_k=\mu_m+\Gamma\alpha_* \quad (18)$$

And therefore:

$$\partial\mu_\alpha/\partial\alpha_k=\gamma_k, (k=1, \ldots K) \quad (19)$$

From this it can be deduced for $k=(1, \ldots, K-1)$:

$$\partial Q/\partial\alpha_k=\gamma_k^T\cdot\Sigma^{-1}\cdot(y-\mu_m-\Gamma\alpha_*)=0 \quad (20)$$

With some algebra one can obtain the expression for the estimator $\hat{\alpha}_*$:

$$\hat{\alpha}_*=A^{-1}\cdot b \quad (21)$$

Where:

$$b=\Gamma\cdot\Sigma^{-1}\cdot(y-\mu_m) \quad (22)$$

$$A=\Gamma\cdot\Sigma^{-1}\cdot\Gamma \quad (23)$$

And finally for the K-th element:

$$\hat{\alpha}_K=1-1^T\cdot\alpha_* \quad (24)$$

where 1 is the identity vector of dimension K-1. The estimator is unbiased. Denoting the covariance matrix with Var, using the "sandwich formula", and taking into account that A is symmetric, it results:

$$\mathrm{Var}\hat{\alpha}_*=A^{-1}\cdot\mathrm{Var}(b)\cdot A^{-1}\mathrm{tm} \quad (25)$$

$$\mathrm{Var}(b)=\Gamma\cdot\Sigma^{-1}\cdot\mathrm{var}(y)\cdot\Sigma^{-1}\cdot\Gamma^T \quad (26)$$

Which gives:

$$\mathrm{Var}(b)=c_\alpha A \quad (27)$$

And therefore the covariance matrix for the estimator $\hat{\alpha}_*$ is:

$$\mathrm{Var}\hat{\alpha}_*=c_\alpha A^{-1} \quad (28)$$

which finally yields:

$$\mathrm{Var}\hat{\alpha}_K=c_\alpha\cdot 1\cdot A^{-1}\cdot 1 \quad (29)$$

Fisher Linear Discriminant Method

An alternate method is proposed here, the Fisher discriminant analysis method comprises finding a set of eigenvalues A associated to a set of eigenvectors w which generate a hyperplane wherein the ratio of intra and inter covariances is maximal:

$$\Sigma_w^{-1}\Sigma_b w=\lambda w \quad (30)$$

The Fischer discriminant method is based on finding the hyperplane containing the projection of the centroids of each level, while maximizing the distance between them, minimizing the variance within each level. Mathematically, this can be expressed as an optimization problem wherein the cost function to be maximized is:

$$J(w) = w \cdot \Sigma_b \cdot w^T / w \cdot \Sigma_w \cdot w^T \quad (31)$$

wherein $w \in R^4$ are the coefficients associated to the hyperplane above, $\Sigma_b \in R^{d \times d}$ and $\Sigma_w \in R^{d \times d}$ are respectively the inter and intra covariance matrices, given by the following expressions:

$$\Sigma_b = \Sigma_{k=1}^{K} (\mu_k - \mu) N_k (\mu_k - \mu)^T \quad (32)$$

$$\Sigma_w = \Sigma_{k=1}^{K} \Sigma_{n=1}^{N_k} (X_n^{(k)} - \mu_k)(X_n^{(k)} - \mu_k)^T \quad (33)$$

Where $N_k$ is the number of elements present in the kth level, $\mu_k$ is the kth level centroid and $\mu$ is the centroid of the level centroids.

By knowing the gradient of the cost function J(w) and equating it to zero, the parameters w defining the hyperplane are obtained. Therefore, the optimum condition is given by the equality:

$$\Sigma_w^{-1} \Sigma_b w = (w \cdot \Sigma_b \cdot w^T / w \cdot \Sigma_w \cdot w^T) w \quad (34)$$

thereby reducing to a diagonalization problem, wherein the set of the first n eigenvalues $\lambda = \{\lambda_1, \lambda_2, \ldots, \lambda_n\}$ define the set of eigenvectors $w = \{w_1, w_2, \ldots, w_n\}$ generators of the hyperplane of interest:

$$\Sigma_w^{-1} \Sigma_b w = \lambda w \quad (35)$$

Subsequently projecting the mixed vector y on the hyperplane found by Fisher's linear discriminant:

$$\hat{y} = (w^T \cdot y \cdot w)/(w^T \cdot w) \quad (36)$$

Then replacing expression (36) in the system of equations (4) and solving for the contribution of each level is obtained by substituting the vector and for the vector of centroids p projected on the hyperplane found by Fisher's method, which results in:

$$\alpha = \mu^{-1} \cdot \hat{y} \quad (37)$$

Where $\alpha$ is the vector that contains the contribution proportions of each geological layer.

Stability of the Covariance Matrix

The use of the inverse of the covariance matrix can be a source of error in cases where the matrix is singular or is badly conditioned. This was a challenge in the two selected methods as both require the inversion of the joint covariance matrix of the data. In cases where the covariance matrix calculated from the experimental data is badly conditioned, the problem can be solved by regularization, selection of variables or other techniques known to those who master the subject.

Example of Unknown Mixture Allocation Procedure Based on Chromatographic Analysis The following example shows the process of creating the allocation model and its use to allocate a sample made up of crude oils of two different levels. The model training data set consists of crude oil samples drawn from a set of neighboring wells in the same reservoir (end members). In this reservoir there are wells producing crude oil from three different geological levels.

The sample whose contributing levels we wanted to estimate was created artificially by mixing crude oils from known levels.

Both the samples of the end members and the mixture to be allocated were analyzed by gas chromatography. In this analysis an internal standard is usually employed, in our case, Bromoethane was used. The synthetic mixtures produced in the laboratory to test the results of the trained models were produced with known proportions of different end members of different geologic levels, for example, some of the mass compositions were 50-50, 70-30 and 30-70.

Once the chromatographic analysis was finished, the model selection was made. Model selection consisted of generating all possible combinations of subsets of variables (chemical components of the chromatogram). The values of the selected variables for the samples measured in the end member was used to calculate the matrices $\Sigma_w^{-1} \Sigma_b$ for the linear discriminant analysis and matrix "A" for maximum likelihodd method." We call those matrices models. Using the data of the end members of the reservoir, a training-testing process was performed. The performance of each model was obtained calculating the root mean square error (RMSE) of the allocation of the end member used as a test set. Once the training for each model was finished, the best models are tested using the previously mentioned synthetic mixtures.

Below are the results obtained for the data set used in the present work (see Table 3, Table 4 and Table 5) The results presented are the product of the procedure described in the above section.

Table 1 shows the models with the best performance. They are ordered in descending order of root mean squared error, in the second column the respective RMSE for each set of variables is shown.

In Table 1, the models with the best performance are ordered in ascending order of RMSE, in the second column the respective RMSE for each set of variables.

TABLE 1

| Variables | RMSE |
| --- | --- |
| Model 1 | 0.0478 |
| Model 2 | 0.049 |
| Model 3 | 0.056 |
| Model 4 | 0.0586 |
| Model 5 | 0.0593 |
| Model 6 | 0.0595 |
| Model 7 | 0.0596 |
| Model 8 | 0.0597 |
| Model 9 | 0.0598 |
| Model 10 | 0.0603 |
| Model 11 | 0.0616 |
| Model 12 | 0.0619 |
| Model 13 | 0.062 |
| Model 14 | 0.0631 |

As a double test, the training results were put to the test again, this time synthetic mixtures of two different levels and of different mass compositions were used. The model 12 showed the best performance.

The results obtained with this model are presented in Table 2, in the first column the name of the mixture is mentioned, in the second the true value of the contribution of level a is observed. In the third and fourth columns one can see the estimation of the a level obtained by the two methods respectively.

TABLE 2

| Mixture | $\alpha_{True}$ | $\alpha_{MLE}$ | $\alpha_{Fisher}$ |
| --- | --- | --- | --- |
| Mixture 1 | 0.2618 | 0.2802 | 0.2704 |
| Mixture 2 | 0.5018 | 0.4710 | 0.4862 |
| Mixture 3 | 0.6853 | 0.7127 | 0.7044 |
| Mixture 4 | 0.5033 | 0.4895 | 0.4959 |
| Mixture 5 | 0.4953 | 0.4626 | 0.5211 |
| Mixture 6 | 0.5011 | 0.5269 | 0.5176 |
| Mixture 7 | 0.4644 | 0.4770 | 0.4677 |

Wells Data

The data used for the development of the previously described methodology presented is presented in tabular format below. In the first column is the name of the well, in the second column its sampling date, and in the third column the level at which it navigates.

TABLE 3

| Wells | Date (dd-mm-yyyy) | Level |
|---|---|---|
| Well 1 | Oct. 10, 2019 | Level 1 |
| Well 2 | Oct. 10, 2019 | Level 2 |
| Well 3 | Oct. 10, 2019 | Level 3 |
| Well 4 | Oct. 10, 2019 | Level 1 |
| Well 5 | Oct. 10, 2019 | Level 2 |
| Well 6 | Oct. 10, 2019 | Level 2 |
| Well 7 | Oct. 10, 2019 | Level 1 |
| Well 2 | Oct. 12, 2019 | Level 2 |
| Well 5 | Oct. 12, 2019 | Level 2 |
| Well 6 | Oct. 12, 2019 | Level 2 |
| Well 7 | Oct. 12, 2019 | Level 1 |
| Well 2 | Aug. 7, 2020 | Level 2 |
| Well 4 | Aug. 7, 2020 | Level 1 |
| Well 5 | Aug. 7, 2020 | Level 2 |
| Well 6 | Aug. 7, 2020 | Level 2 |
| Well 7 | Aug. 7, 2020 | Level 1 |
| Well 1 | Aug. 7, 2020 | Level 1 |

Mixture Data

TABLE 4

| Mixture | End member 1 | End member 2 | α |
|---|---|---|---|
| Mixture 1 | Well 5 | Well 7 | 0.2618 |
| Mixture 2 | Well 2 | Well 4 | 0.5018 |
| Mixture 3 | Well 5 | Well 7 | 0.6853 |
| Mixture 4 | Well 6 | Well 7 | 0.5033 |
| Mixture 5 | Well 5 | Well 7 | 0.4953 |
| Mixture 6 | Well 5 | Well 1 | 0.5011 |
| Mixture 7 | | | 0.4644 |

Chromatography Data

TABLE 5

| Peaks | Well 1<br>Oct. 10, 2019<br>Level 1<br>Area | Well 2<br>Oct. 10, 2019<br>Level 2<br>Area | Well 3<br>Oct. 10, 2019<br>Level 3<br>Area | Well 4<br>Oct. 10, 2019<br>Level 1<br>Area |
|---|---|---|---|---|
| Peak 1 | 0.015800510100369 | 0.009428341573625 | 0.012723546731719 | 0.007225816247286 |
| Peak 2 | 0.01040141846736 | 0.007862110217586 | 0.008327000478036 | 0.005107772206387 |
| Peak 3 | 0.042498999259246 | 0.032997952389445 | 0.036293495980195 | 0.021975618366674 |
| Peak 4 | 0.03355143795889 | 0.029873499826627 | 0.030535934658575 | 0.021370178771776 |
| Peak 5 | 0.053566192673363 | 0.048013307089266 | 0.051264195356161 | 0.036389221327534 |
| Peak 6 | 0.012074211169042 | 0.01173902783719 | 0.011253364468508 | 0.010452129957653 |
| Peak 7 | 0.004197183530978 | 0.004067852721638 | 0.003892307867498 | 0.003627163151793 |
| Peak 8 | 0.008227419174253 | 0.006988790487703 | 0.008937647122815 | 0.006203929372615 |
| Peak 9 | 0.028312361031304 | 0.028407974286079 | 0.027325682062897 | 0.022986410900411 |
| Peak 10 | 0.017360622407082 | 0.017436745089957 | 0.016225453954983 | 0.0143342819191 |
| Peak 11 | 0.054192521066777 | 0.053309104564344 | 0.053692670358532 | 0.046043883407163 |
| Peak 12 | 0.001304392843782 | 0.001515308185899 | 0.001105394886698 | 0.001216330175293 |
| Peak 13 | 0.022418801794453 | 0.019956694693069 | 0.025078679323723 | 0.019183570910237 |
| Peak 14 | 0.003213563216421 | 0.003235235289212 | 0.003273849929861 | 0.00282426847624 |
| Peak 15 | 0.000182329402459 | 0.000171604096263 | 0.000157226505575 | 0.000158310254826 |
| Peak 16 | 0.003733990767564 | 0.00315419101243 | 0.004499324759516 | 0.002986017201985 |
| Peak 17 | 0.000726220851712 | 0.000882597818382 | 0.00059916716196 | 0.000678430947612 |
| Peak 18 | 0.029646583043869 | 0.032605026499844 | 0.027536440481655 | 0.028449231495772 |
| Peak 19 | 0.019347186703333 | 0.021525099127353 | 0.018067148823173 | 0.018381680791257 |
| Peak 20 | 0.00470183902025 | 0.004283155423321 | 0.005187495816669 | 0.004309968720298 |
| Peak 21 | 0.003986433518616 | 0.003422332237818 | 0.004741564097859 | 0.00360936912148 |
| Peak 22 | 0.019543981021572 | 0.021444041612706 | 0.018585406963905 | 0.018778753130204 |
| Peak 23 | 0.005152391866508 | 0.004506441798534 | 0.006463107700735 | 0.00477465474624 |
| Peak 24 | 0.006128603869088 | 0.005640589247181 | 0.007314959296143 | 0.005735142352175 |
| Peak 25 | 0.007504838394279 | 0.006691515203968 | 0.009240733400262 | 0.006993207355628 |
| Peak 26 | 0.053397489265585 | 0.05359242093332 | 0.053365828184202 | 0.051141848526072 |
| Peak 27 | 0.067454385152345 | 0.074335773674294 | 0.066819681684035 | 0.067911783678942 |
| Peak 28 | 0.003031702902044 | 0.002592288329048 | 0.003909280025957 | 0.002942791790256 |
| Peak 29 | 0.004623586324526 | 0.005184808734413 | 0.004419934861782 | 0.004681489115923 |
| Peak 30 | 0.004140186955413 | 0.004425278794652 | 0.004143357011697 | 0.00407776308743 |
| Peak 31 | 0.003202712911297 | 0.002796208949094 | 0.003998245483953 | 0.003139475501474 |
| Peak 32 | 0.000840518672747 | 0.000974660962885 | 0.000740278658599 | 0.000815495851347 |
| Peak 33 | 0.002456744184919 | 0.002123183077982 | 0.003105648322925 | 0.002413721171132 |
| Peak 34 | 0.000312284926266 | 0.000260049580523 | 0.000508998619657 | 0.000306929448837 |
| Peak 35 | 0.018437259824522 | 0.015125764283901 | 0.019408182527102 | 0.016561095475656 |
| Peak 36 | 0.044910084386645 | 0.04487184428385 | 0.045694419394022 | 0.045578216256741 |
| Peak 37 | 0.022808684764537 | 0.025346811541233 | 0.023618482190477 | 0.025159762999255 |
| Peak 38 | 0.022098230796172 | 0.019170235626818 | 0.021381284780595 | 0.021371537455328 |
| Peak 39 | 0.011405754177727 | 0.009654730573403 | 0.012305017745752 | 0.011166511407484 |
| Peak 40 | 0.010551664747902 | 0.012116656546636 | 0.009446524024677 | 0.01150073130989 |
| Peak 41 | 0.042653053050511 | 0.041191063006102 | 0.043720128576942 | 0.04415365374901 |
| Peak 42 | 0.038919266834696 | 0.036776003843083 | 0.040278980741385 | 0.04053861141507 |
| Peak 43 | 0.03630054096783 | 0.032788113616462 | 0.037942167352932 | 0.037391737040748 |
| Peak 44 | 0.034889426485519 | 0.031147497457007 | 0.038435464804155 | 0.036169771446696 |
| Peak 45 | 0.008176605326345 | 0.007870476548146 | 0.007217026866858 | 0.009010123011343 |
| Peak 46 | 0.010281017322722 | 0.009945234689287 | 0.011376864467956 | 0.011643360580226 |

TABLE 5-continued

| | | | | |
|---|---|---|---|---|
| Peak 47 | 0.033682605257616 | 0.029105186149881 | 0.035693222681083 | 0.033706415052143 |
| Peak 48 | 0.007794956211479 | 0.007563566994613 | 0.007590920442734 | 0.008839109159793 |
| Peak 49 | 0.033203895474701 | 0.028224554154424 | 0.037039898111566 | 0.033746578040278 |
| Peak 50 | 0.012480976131586 | 0.011377002019837 | 0.012984613036881 | 0.013501791752153 |
| Peak 51 | 0.029434988931883 | 0.024078323344713 | 0.032956136267547 | 0.029457133567255 |
| Peak 52 | 0.029128338241137 | 0.022111603555117 | 0.03131867916096 | 0.027443218731402 |
| Peak 53 | 0.009392098857941 | 0.008249280945461 | 0.008741432912822 | 0.01005260102814 |
| Peak 54 | 0.026064740801805 | 0.020036751094189 | 0.029948303353991 | 0.025554825469182 |
| Peak 55 | 0.011626229029049 | 0.009549406397827 | 0.011285204135278 | 0.014298971264238 |
| Peak 56 | 0.021302987106986 | 0.016561144724177 | 0.024048419336905 | 0.021159164822943 |
| Peak 57 | 0.011270215772109 | 0.010578509734475 | 0.00962005217314 | 0.01236411896123 |
| Peak 58 | 0.020718635408065 | 0.015924944110867 | 0.023393540445538 | 0.020612067364308 |
| Peak 59 | 0.018892378835458 | 0.0144028726171 | 0.020982477921087 | 0.018748438046743 |
| Peak 60 | 0.015534551398299 | 0.01129347895287 | 0.017069353748217 | 0.015170430516305 |
| Peak 61 | 0.015333715241068 | 0.010948779018454 | 0.01660410691017 | 0.014675335300586 |
| Peak 62 | 0.013154603448864 | 0.009756264996494 | 0.014045342617888 | 0.012764814582293 |
| Peak 63 | 0.012032762252586 | 0.008761163529293 | 0.012861816865242 | 0.011892367780819 |
| Peak 64 | 0.010625643865627 | 0.007294713406624 | 0.01100824960065 | 0.009728851492665 |
| Peak 65 | 0.009249419265942 | 0.006906843140331 | 0.009984282210278 | 0.009120837390854 |
| Peak 66 | 0.008135174534727 | 0.006127364565668 | 0.008966087232933 | 0.007946829735772 |
| Peak 67 | 0.007878868172262 | 0.005799184659168 | 0.008341033044983 | 0.007923459622811 |
| Peak 68 | 0.007535585456671 | 0.0057159064927 | 0.007908431346551 | 0.00752368012106 |
| Peak 69 | 0.00669704886448 | 0.004959864730316 | 0.007210202982916 | 0.006364627433471 |
| Peak 70 | 0.006474769297093 | 0.004685658908112 | 0.007064205691291 | 0.006282439361551 |
| Peak 71 | 0.006297820382415 | 0.004424328150485 | 0.006822299475333 | 0.005910951846446 |
| Peak 72 | 0.005869233545824 | 0.004250212996742 | 0.006349121762032 | 0.005773144674423 |
| Peak 73 | 0.005303499939968 | 0.004166521560681 | 0.006017618009706 | 0.005608650236299 |
| Peak 74 | 0.005038918725626 | 0.004052546854135 | 0.004294589022655 | 0.004736292627959 |
| Peak 75 | 0.004577028361323 | 0.003768212824301 | 0.003783050985429 | 0.00439103772073 |
| Peak 76 | 0.003728898551024 | 0.003204829154794 | 0.003496965907879 | 0.003785581874541 |

| | Well 5<br>Oct. 10, 2019<br>Level 2 | Well 6<br>Oct. 10, 2019<br>Level 2 | Well 7<br>Oct. 10, 2019<br>Level 1 | Well 2<br>Oct. 12, 2019<br>Level 2 |
|---|---|---|---|---|
| Peak 1 | 0.007855983344957 | 0.007183173103253 | 0.009245131975025 | 0.00506740430991 |
| Peak 2 | 0.006770193116004 | 0.005528014075325 | 0.006905216593123 | 0.003577816954359 |
| Peak 3 | 0.028496664469501 | 0.022762891570737 | 0.029378604618958 | 0.015348427909796 |
| Peak 4 | 0.027431110052896 | 0.022823234248628 | 0.027317965200791 | 0.018188499342756 |
| Peak 5 | 0.044600166665185 | 0.037806914453527 | 0.045112940377188 | 0.032405460169754 |
| Peak 6 | 0.010913044779395 | 0.010834441609292 | 0.010788408057024 | 0.011210596513231 |
| Peak 7 | 0.003770971094279 | 0.003778869937409 | 0.003704412849717 | 0.003978028052787 |
| Peak 8 | 0.006849618185529 | 0.006052160564472 | 0.00720169047245 | 0.005764881890627 |
| Peak 9 | 0.027880162921251 | 0.024988600723793 | 0.026604539096182 | 0.023952548911322 |
| Peak 10 | 0.017283377295027 | 0.015644649287544 | 0.016453273183371 | 0.015136544629618 |
| Peak 11 | 0.052835504908302 | 0.048695550891313 | 0.051752775897558 | 0.047983216065924 |
| Peak 12 | 0.001595311466466 | 0.001488726883833 | 0.001301307969623 | 0.001488558166895 |
| Peak 13 | 0.020383316048862 | 0.018713996860134 | 0.021131221767372 | 0.018430778160724 |
| Peak 14 | 0.003327270580509 | 0.003089859170995 | 0.00313744051198 | 0.00312289895494 |
| Peak 15 | 0.000200251164853 | 0.000195404430059 | 0.000173122446184 | 0.00022621259327 |
| Peak 16 | 0.003170117230722 | 0.002979343938631 | 0.003188448170738 | 0.003058327957664 |
| Peak 17 | 0.000938720802138 | 0.00090154178549 | 0.00073759428126 | 0.000959297277257 |
| Peak 18 | 0.033170823765211 | 0.031413699403993 | 0.030632603982479 | 0.031353237290869 |
| Peak 19 | 0.022279105421912 | 0.021053922847359 | 0.019719956987602 | 0.021289395340691 |
| Peak 20 | 0.004351157637831 | 0.004190158165518 | 0.004581714606139 | 0.004236605680461 |
| Peak 21 | 0.003573440166337 | 0.003401524414616 | 0.003855467826157 | 0.003399745719593 |
| Peak 22 | 0.022127090253496 | 0.021061599805494 | 0.019991502031757 | 0.021349611183707 |
| Peak 23 | 0.004711703227892 | 0.004483676870324 | 0.005028018537949 | 0.004522770381962 |
| Peak 24 | 0.005871342119734 | 0.00560988014182 | 0.006046258135733 | 0.005640659484308 |
| Peak 25 | 0.006994566033034 | 0.006692716371872 | 0.007365643571607 | 0.006724445394652 |
| Peak 26 | 0.055064775015734 | 0.053509828577236 | 0.053548999195028 | 0.054066629769108 |
| Peak 27 | 0.078469319976797 | 0.07549481137318 | 0.070724927694739 | 0.074430462211174 |
| Peak 28 | 0.002742271462097 | 0.002656626926986 | 0.00302571748373 | 0.002682848121441 |
| Peak 29 | 0.005503091826115 | 0.005290643606863 | 0.004881123949162 | 0.00541282128797 |
| Peak 30 | 0.004646389090977 | 0.004515889332804 | 0.004202852659719 | 0.00465720950005 |
| Peak 31 | 0.002999497048583 | 0.002876887125626 | 0.003188397934622 | 0.002899332016126 |
| Peak 32 | 0.001071551266599 | 0.001026133956977 | 0.00085820742746 | 0.001102940531673 |
| Peak 33 | 0.002266512142315 | 0.002213430181436 | 0.002447030083801 | 0.002289734188373 |
| Peak 34 | 0.000273221401441 | 0.000299769365145 | 0.000302969409093 | 0.000362718810609 |
| Peak 35 | 0.015897316615094 | 0.015405183842199 | 0.017094544736298 | 0.015721984766407 |
| Peak 36 | 0.046639471454188 | 0.046402810229593 | 0.045547922763047 | 0.046846274513521 |
| Peak 37 | 0.026439772582271 | 0.026262437240679 | 0.024718237000931 | 0.026616202539719 |
| Peak 38 | 0.020533235322947 | 0.020241150148593 | 0.021256565481138 | 0.020069973330132 |
| Peak 39 | 0.010101155615957 | 0.010082025867715 | 0.011126270634845 | 0.010280922259276 |
| Peak 40 | 0.012813597333114 | 0.012625093624162 | 0.011274826783161 | 0.012825801785145 |
| Peak 41 | 0.043028616175721 | 0.043221961337175 | 0.042870165735038 | 0.04348393386237 |
| Peak 42 | 0.038313277535339 | 0.038652479354238 | 0.038532844389762 | 0.038826872219931 |
| Peak 43 | 0.03415127436089 | 0.03457925149733 | 0.035241255612516 | 0.034425437282888 |
| Peak 44 | 0.032410468944738 | 0.032900378228633 | 0.033672414371213 | 0.03272256532249 |
| Peak 45 | 0.008244073902239 | 0.008300535041925 | 0.008379517650932 | 0.008249019765231 |

TABLE 5-continued

| | | | | |
|---|---|---|---|---|
| Peak 46 | 0.010301819321097 | 0.010416247913075 | 0.010669358928561 | 0.010495311642906 |
| Peak 47 | 0.030206173725958 | 0.030855735051384 | 0.031299830443241 | 0.030552514810155 |
| Peak 48 | 0.007824345772611 | 0.00798979958454 | 0.00811214471619 | 0.008005013172925 |
| Peak 49 | 0.029175426803329 | 0.029880377867139 | 0.031140088386486 | 0.029508981888599 |
| Peak 50 | 0.011892456121286 | 0.012087996220467 | 0.012393001086 | 0.012140667823021 |
| Peak 51 | 0.024921052934509 | 0.025550780732904 | 0.027099096910339 | 0.025158378404865 |
| Peak 52 | 0.024360288977338 | 0.025142955438347 | 0.025137124153939 | 0.023014025213175 |
| Peak 53 | 0.008723695057483 | 0.008842657942261 | 0.009234397772993 | 0.008797692781026 |
| Peak 54 | 0.020666640735796 | 0.021366167830445 | 0.023435581701085 | 0.020917838715141 |
| Peak 55 | 0.009911472041997 | 0.010145104050963 | 0.011380025395878 | 0.010044588895553 |
| Peak 56 | 0.017116787678909 | 0.017662788865318 | 0.019300316292858 | 0.017316884536537 |
| Peak 57 | 0.01085692388939 | 0.011265520943269 | 0.011186751987765 | 0.009921254465564 |
| Peak 58 | 0.016503041931387 | 0.017021815286481 | 0.018888309813171 | 0.016813777000291 |
| Peak 59 | 0.014835195687524 | 0.015403813029671 | 0.017057386756017 | 0.015311482196743 |
| Peak 60 | 0.011698504098878 | 0.012117852598916 | 0.013940864562635 | 0.011824543680618 |
| Peak 61 | 0.011021560261602 | 0.01151427078763 | 0.013147338646004 | 0.01158273626262 |
| Peak 62 | 0.009882873200308 | 0.010191800616526 | 0.011909965762258 | 0.009860048059615 |
| Peak 63 | 0.009241654008355 | 0.00959284896934 | 0.011246547617704 | 0.009648931479299 |
| Peak 64 | 0.007440357699293 | 0.00787700007261 | 0.008911890282583 | 0.007564810743841 |
| Peak 65 | 0.007141988331953 | 0.007511886603747 | 0.008377742641509 | 0.00727079795967 |
| Peak 66 | 0.006092779441179 | 0.006538073623495 | 0.007362769647152 | 0.006339306220016 |
| Peak 67 | 0.006085506640431 | 0.006250615052405 | 0.007084590923912 | 0.005952406875272 |
| Peak 68 | 0.005577270047049 | 0.005857351785095 | 0.006618025092084 | 0.005699475248647 |
| Peak 69 | 0.005165333159602 | 0.005529993185911 | 0.006029183298625 | 0.005385412806201 |
| Peak 70 | 0.004601168906292 | 0.005226799645307 | 0.005836064785202 | 0.004835635842283 |
| Peak 71 | 0.004397213967388 | 0.00517896848759 | 0.005709539685447 | 0.004795851346151 |
| Peak 72 | 0.004321427471581 | 0.004627038157982 | 0.005344058965725 | 0.004417224551715 |
| Peak 73 | 0.003803063883494 | 0.004393000069499 | 0.004629683817162 | 0.004257762609502 |
| Peak 74 | 0.003260510576822 | 0.004006011533342 | 0.003967852715232 | 0.00375313164146 |
| Peak 75 | 0.002950746562247 | 0.003657870437088 | 0.003756339410759 | 0.003117387520931 |
| Peak 76 | 0.002812155549604 | 0.003277033422149 | 0.003644113184083 | 0.002627580939781 |

| | Well 5<br>Oct. 12, 2019<br>Level 2 | Well 6<br>Oct. 12, 2019<br>Level 2 | Well 7<br>Oct. 12, 2019<br>Level 1 | Well 2<br>Aug. 7, 2020<br>Level 2 |
|---|---|---|---|---|
| Peak 1 | 0.004094325171653 | 0.005567991087755 | 0.00635190300674 | 0.006126339873216 |
| Peak 2 | 0.003350803743268 | 0.004286286547574 | 0.005186607079824 | 0.006490998028522 |
| Peak 3 | 0.014632114967079 | 0.018500495600018 | 0.022749083223464 | 0.02894976385197 |
| Peak 4 | 0.015923313264653 | 0.018857606925855 | 0.022060886698912 | 0.031018531348095 |
| Peak 5 | 0.027552128661801 | 0.032097024268246 | 0.037260266309553 | 0.05115241374313 |
| Peak 6 | 0.010696691256351 | 0.010966622914141 | 0.010852429681109 | 0.010193394683801 |
| Peak 7 | 0.003770598885635 | 0.003846046994685 | 0.003806577905671 | 0.003754763268816 |
| Peak 8 | 0.004934236975109 | 0.005407426949944 | 0.006275116285604 | 0.007715829348351 |
| Peak 9 | 0.020256610851809 | 0.02250356696958 | 0.023353755792458 | 0.032499900608154 |
| Peak 10 | 0.012917342616099 | 0.014234926275573 | 0.014626641202558 | 0.019926417545188 |
| Peak 11 | 0.04111852675296 | 0.044962523412121 | 0.046814753330262 | 0.06084981557363 |
| Peak 12 | 0.001324582516185 | 0.001425091601429 | 0.001214635022907 | 0.001795110113859 |
| Peak 13 | 0.01665054554818 | 0.017457713357254 | 0.019448827887289 | 0.022340087317622 |
| Peak 14 | 0.002740194914247 | 0.002908864930148 | 0.002871339131741 | 0.003799017052777 |
| Peak 15 | 0.000186895337124 | 0.000206825812533 | 0.000159573378859 | 0.000206411246125 |
| Peak 16 | 0.002675503129786 | 0.002823200135139 | 0.003049574897645 | 0.003457003285288 |
| Peak 17 | 0.000865622214453 | 0.000896210277225 | 0.000715225136648 | 0.001054362769322 |
| Peak 18 | 0.02852225682737 | 0.030165953727732 | 0.029051616998299 | 0.036131598997126 |
| Peak 19 | 0.019540485036004 | 0.020516202037286 | 0.018926786342601 | 0.024920037525309 |
| Peak 20 | 0.003837924650405 | 0.004014465976553 | 0.004364519580087 | 0.004903125373844 |
| Peak 21 | 0.003164426076874 | 0.003237653548927 | 0.003660039754396 | 0.003872676253044 |
| Peak 22 | 0.019634890864474 | 0.020554501834911 | 0.019243551537488 | 0.024702485755041 |
| Peak 23 | 0.004221948915946 | 0.004317840961901 | 0.00485067957198 | 0.005093045941445 |
| Peak 24 | 0.005283176895847 | 0.005429756574029 | 0.005839361292845 | 0.006390313326346 |
| Peak 25 | 0.006288993213265 | 0.006442163684061 | 0.007095158671412 | 0.007597044025559 |
| Peak 26 | 0.050424617976954 | 0.052472568011354 | 0.052525572979028 | 0.060832528623169 |
| Peak 27 | 0.072493139917359 | 0.074077486728911 | 0.069474711446411 | 0.081912759580198 |
| Peak 28 | 0.002565485307296 | 0.002587232179803 | 0.002935113330434 | 0.002961142334757 |
| Peak 29 | 0.005218394284479 | 0.005348534992884 | 0.004847142523908 | 0.0059137417398 |
| Peak 30 | 0.004399259669065 | 0.00454528732256 | 0.004198809620977 | 0.005121010542525 |
| Peak 31 | 0.002816156484296 | 0.002825510744455 | 0.003173163931345 | 0.003153007052082 |
| Peak 32 | 0.001024787201334 | 0.001078145728966 | 0.000879010938304 | 0.001172104603637 |
| Peak 33 | 0.002193287728473 | 0.002209887005855 | 0.002443682443375 | 0.002422612051946 |
| Peak 34 | 0.00026729676519 | 0.000315879053097 | 0.000300860450363 | 0.000314116736234 |
| Peak 35 | 0.015329488224679 | 0.015421385220967 | 0.017265906139194 | 0.016467535656952 |
| Peak 36 | 0.046374855129757 | 0.047037169760319 | 0.046922912363285 | 0.050112598716436 |
| Peak 37 | 0.026581797521547 | 0.026784519895815 | 0.025539712598609 | 0.028023636470156 |
| Peak 38 | 0.020836686915404 | 0.02065505036056 | 0.022053032784396 | 0.020467937489251 |
| Peak 39 | 0.010487773165946 | 0.010360901074439 | 0.011697244200865 | 0.010796527787426 |
| Peak 40 | 0.013031946131358 | 0.013080451027559 | 0.01171870798943 | 0.013640565952794 |
| Peak 41 | 0.043838603294055 | 0.044484516157759 | 0.045100071025878 | 0.045547566441854 |
| Peak 42 | 0.040049760992596 | 0.039953357580096 | 0.040987450118315 | 0.040548989183395 |
| Peak 43 | 0.03569281557543 | 0.03566296618117 | 0.037347003248906 | 0.035999391960567 |
| Peak 44 | 0.033922665248941 | 0.033848279685376 | 0.035943727726246 | 0.034678123126835 |

TABLE 5-continued

| | | | | |
|---|---|---|---|---|
| Peak 45 | 0.008578754894621 | 0.0085032751481 | 0.008784876880204 | 0.00858398586734 |
| Peak 46 | 0.010768163077546 | 0.01067540135784 | 0.011274958310283 | 0.010939151501331 |
| Peak 47 | 0.031583654915852 | 0.031495898711164 | 0.033381170249164 | 0.03158922769936 |
| Peak 48 | 0.008168701684281 | 0.008160769420453 | 0.008555900491907 | 0.008373539448437 |
| Peak 49 | 0.03041165520749 | 0.030399567339822 | 0.033247555038231 | 0.029860123592837 |
| Peak 50 | 0.012486439300341 | 0.012374331429178 | 0.013189097017722 | 0.012678425068659 |
| Peak 51 | 0.026026226386945 | 0.025880521526322 | 0.029066364193477 | 0.026619242591662 |
| Peak 52 | 0.023791069586343 | 0.023694117722871 | 0.026992250019783 | 0.024331528230941 |
| Peak 53 | 0.009079577872221 | 0.009008311889529 | 0.009778286636967 | 0.009347681866206 |
| Peak 54 | 0.021558664883671 | 0.021516232061419 | 0.025051339887567 | 0.02256631958491 |
| Peak 55 | 0.010327412504663 | 0.01014117605426 | 0.012040449325477 | 0.010748255824295 |
| Peak 56 | 0.017847131204842 | 0.01775741545972 | 0.020707465059703 | 0.019427324572182 |
| Peak 57 | 0.01007025850386 | 0.010147792921185 | 0.011916264178633 | 0.010618820768955 |
| Peak 58 | 0.017200697770403 | 0.017266354394431 | 0.020166241386662 | 0.017266573101387 |
| Peak 59 | 0.015530523136524 | 0.015469897658574 | 0.01820304223723 | 0.016725643482911 |
| Peak 60 | 0.012278791080967 | 0.0121547575596 | 0.014858931302908 | 0.013027095879938 |
| Peak 61 | 0.012012094285066 | 0.011852566075787 | 0.014655553102855 | 0.012928989755533 |
| Peak 62 | 0.010100574222827 | 0.010200014302984 | 0.012722949336683 | 0.011140763671519 |
| Peak 63 | 0.009420344224147 | 0.009585433273353 | 0.011506322453721 | 0.010144007211661 |
| Peak 64 | 0.007829701979663 | 0.007767615197972 | 0.009421039827816 | 0.008863801004996 |
| Peak 65 | 0.007581255422264 | 0.007329622571659 | 0.008761250323799 | 0.008003283517598 |
| Peak 66 | 0.006537343826748 | 0.006423280984217 | 0.007735731370133 | 0.006804852173045 |
| Peak 67 | 0.006199758548661 | 0.006210591755979 | 0.007346360502533 | 0.006586276740176 |
| Peak 68 | 0.005969586109139 | 0.005565927536782 | 0.007175685548422 | 0.005923514683076 |
| Peak 69 | 0.005616963221276 | 0.005285502890425 | 0.00641993999236 | 0.005267638678869 |
| Peak 70 | 0.004996956152656 | 0.005087849694321 | 0.006191756632699 | 0.005064384602421 |
| Peak 71 | 0.004725080943792 | 0.004841924213596 | 0.005956110299759 | 0.004783144024707 |
| Peak 72 | 0.004298945827454 | 0.004727874946945 | 0.005925155349636 | 0.004209945566908 |
| Peak 73 | 0.004287504622069 | 0.003869824825673 | 0.004656898215593 | 0.003944085418635 |
| Peak 74 | 0.00363063632732 | 0.003836417090143 | 0.003946008522322 | 0.002971492251499 |
| Peak 75 | 0.003490810648993 | 0.003731476373549 | 0.003856127127418 | 0.002588356379314 |
| Peak 76 | 0.002878307247443 | 0.003153493738203 | 0.003408737607836 | 0.00245297437025 |

| | Well 4<br>Aug. 7, 2020<br>Level 1 | Well 5<br>Aug. 7, 2020<br>Level 2 | Well 6<br>Aug. 7, 2020<br>Level 2 | Well 7<br>Aug. 7, 2020<br>Level 1 |
|---|---|---|---|---|
| Peak 1 | 0.006234287783617 | 0.006989765434986 | 0.008221307688352 | 0.008822091107779 |
| Peak 2 | 0.005900109138314 | 0.006324365308216 | 0.007281099544046 | 0.007644147404768 |
| Peak 3 | 0.027032413405057 | 0.027279226305162 | 0.031208265326483 | 0.0326884590728 |
| Peak 4 | 0.027904748669394 | 0.027597974804992 | 0.030195461045035 | 0.029397802913991 |
| Peak 5 | 0.047293707493935 | 0.04553626800931 | 0.049131644572717 | 0.047915849814256 |
| Peak 6 | 0.011860252857125 | 0.011131417407142 | 0.01130011359493 | 0.01134193311293 |
| Peak 7 | 0.004279418301188 | 0.003987724758724 | 0.004107892036861 | 0.004084114464559 |
| Peak 8 | 0.007728939561759 | 0.007097751513336 | 0.007300698625504 | 0.007454129721922 |
| Peak 9 | 0.028732521201424 | 0.029190545191521 | 0.03031713872751 | 0.02790255185595 |
| Peak 10 | 0.017644234286429 | 0.018062093272103 | 0.018680657661867 | 0.017180167824891 |
| Peak 11 | 0.056148073011857 | 0.055607819403774 | 0.057283890309858 | 0.054265743096336 |
| Peak 12 | 0.001350287441136 | 0.001675702075444 | 0.0017057721889 | 0.001365919816061 |
| Peak 13 | 0.022739291549358 | 0.021299164508459 | 0.021286367072579 | 0.021830261906675 |
| Peak 14 | 0.003348037117635 | 0.003510308077485 | 0.003524331115025 | 0.003265023475383 |
| Peak 15 | 0.000162444304994 | 0.00019621313106 | 0.000192399492097 | 0.000165977156883 |
| Peak 16 | 0.003504995960424 | 0.003256909621763 | 0.003288950854266 | 0.003320797123467 |
| Peak 17 | 0.000744447928235 | 0.000980796065508 | 0.000998095344085 | 0.000765301470247 |
| Peak 18 | 0.032209237243845 | 0.034326282488812 | 0.034795546437156 | 0.031549844409808 |
| Peak 19 | 0.021137902282964 | 0.023557449348674 | 0.023627849713388 | 0.020887264175412 |
| Peak 20 | 0.00498954632485 | 0.00457979412767 | 0.004609649969107 | 0.004798293765041 |
| Peak 21 | 0.004135891316585 | 0.003730934451046 | 0.003691078776824 | 0.003986780895254 |
| Peak 22 | 0.021435961396298 | 0.023320633193845 | 0.023413130528804 | 0.021073158267512 |
| Peak 23 | 0.005452840505573 | 0.004935832381041 | 0.004874582251291 | 0.005248151464971 |
| Peak 24 | 0.006543786177999 | 0.006152792217419 | 0.006107491872987 | 0.006322797884886 |
| Peak 25 | 0.007973854626713 | 0.007306200053013 | 0.007243756663128 | 0.00768946442927 |
| Peak 26 | 0.057732403954408 | 0.057881953245085 | 0.058298271229076 | 0.056887473470851 |
| Peak 27 | 0.073567574858761 | 0.080811072425099 | 0.080115881181976 | 0.073590240404332 |
| Peak 28 | 0.003258798686717 | 0.002872229884245 | 0.002830934269356 | 0.00316358694542 |
| Peak 29 | 0.00511491088431 | 0.005769048847335 | 0.00571986090288 | 0.005165235091841 |
| Peak 30 | 0.004500356887033 | 0.00487735590411 | 0.004898375901359 | 0.004488821394234 |
| Peak 31 | 0.003459605358285 | 0.003079869654543 | 0.00302819533727 | 0.003375419531679 |
| Peak 32 | 0.000890937186114 | 0.001104246016678 | 0.001115250957826 | 0.000923133787059 |
| Peak 33 | 0.002641004535553 | 0.002345706624711 | 0.002339234027432 | 0.00256950712431 |
| Peak 34 | 0.000328452408207 | 0.000256700055395 | 0.000286885969474 | 0.000300903602631 |
| Peak 35 | 0.018002433937704 | 0.016518107401094 | 0.016254000560519 | 0.018037642510592 |
| Peak 36 | 0.049022031716297 | 0.048892454753151 | 0.049029197896339 | 0.049250574913069 |
| Peak 37 | 0.026339049333195 | 0.027424362479426 | 0.02739962642565 | 0.026296837997207 |
| Peak 38 | 0.02174868592685 | 0.021063651954492 | 0.020638837633846 | 0.022446904977566 |
| Peak 39 | 0.012202894080198 | 0.010831341015375 | 0.010777912367881 | 0.012271864312084 |
| Peak 40 | 0.011963050130248 | 0.013447211235377 | 0.013436342260214 | 0.01218461036159 |
| Peak 41 | 0.046091677192071 | 0.045015115538641 | 0.045104147399117 | 0.046708275235653 |
| Peak 42 | 0.041842951917514 | 0.040282866243392 | 0.04040905260590 | 0.042240595025121 |
| Peak 43 | 0.038188115640451 | 0.035791170403321 | 0.036023054169932 | 0.038674360726307 |

TABLE 5-continued

| | | | | |
|---|---|---|---|---|
| Peak 44 | 0.037156120236942 | 0.034338443983921 | 0.034690062000449 | 0.037618719877085 |
| Peak 45 | 0.008947373065373 | 0.008536119650381 | 0.008503137072452 | 0.008981518818146 |
| Peak 46 | 0.011722442627046 | 0.010801813347175 | 0.010802139096496 | 0.011579833232532 |
| Peak 47 | 0.034729235905127 | 0.031346154833407 | 0.031720547564273 | 0.034964048508958 |
| Peak 48 | 0.008825609822138 | 0.008207881823247 | 0.008252878534822 | 0.008810337620164 |
| Peak 49 | 0.033622070910405 | 0.029437409693182 | 0.0298449179115 | 0.033637772442902 |
| Peak 50 | 0.013559974341724 | 0.012585186396016 | 0.012577463865746 | 0.01359391404146 |
| Peak 51 | 0.030493359516674 | 0.026258522780893 | 0.026623008527268 | 0.03053370896764 |
| Peak 52 | 0.028316609375408 | 0.023901636932685 | 0.024293739032727 | 0.028253754042828 |
| Peak 53 | 0.010200829833088 | 0.009317933162409 | 0.00915337966962 | 0.010264642401008 |
| Peak 54 | 0.026890254796934 | 0.022168439095848 | 0.022480131113553 | 0.026726831752933 |
| Peak 55 | 0.012866909589333 | 0.010538929065314 | 0.010620515642026 | 0.012707267196265 |
| Peak 56 | 0.022776370882606 | 0.019160036411685 | 0.019273377822353 | 0.022673494549702 |
| Peak 57 | 0.011317806816912 | 0.010199988562297 | 0.010436174060725 | 0.011175271117991 |
| Peak 58 | 0.020791148097023 | 0.016865121982257 | 0.017335526872061 | 0.020688901823789 |
| Peak 59 | 0.020056479999601 | 0.016427959375227 | 0.016647440828045 | 0.020008437752025 |
| Peak 60 | 0.016157314515667 | 0.01298608159002 | 0.013310547847339 | 0.016160610619517 |
| Peak 61 | 0.014529393422947 | 0.012548042913417 | 0.012787134745617 | 0.015600405000165 |
| Peak 62 | 0.013745875233467 | 0.010745997367494 | 0.01071750784729 | 0.014354466546103 |
| Peak 63 | 0.012380556265346 | 0.009428900678241 | 0.010104234673248 | 0.012398770507318 |
| Peak 64 | 0.010807282414933 | 0.008844348702023 | 0.008114415125316 | 0.011052752255035 |
| Peak 65 | 0.009443916032231 | 0.007809286895399 | 0.007763862054988 | 0.009400430170921 |
| Peak 66 | 0.008439477809766 | 0.006935944730988 | 0.007107520337281 | 0.008264111920001 |
| Peak 67 | 0.008091136735886 | 0.006575242924314 | 0.006534532990921 | 0.007879912107895 |
| Peak 68 | 0.007693445879592 | 0.006222350274214 | 0.006189783007517 | 0.007621871358188 |
| Peak 69 | 0.006511355366837 | 0.005599374555644 | 0.005462864391748 | 0.006401320049042 |
| Peak 70 | 0.006368781586941 | 0.005076888140674 | 0.005250086608034 | 0.006166808522699 |
| Peak 71 | 0.005982765839157 | 0.004849064925595 | 0.004987103593346 | 0.005880619836745 |
| Peak 72 | 0.005375255744305 | 0.004550893557228 | 0.004733422244672 | 0.005258254545459 |
| Peak 73 | 0.004888460862256 | 0.004260559354765 | 0.003990461091157 | 0.004725445279894 |
| Peak 74 | 0.004213888363626 | 0.00413691606142 | 0.003788885385055 | 0.004202521872115 |
| Peak 75 | 0.003746402061167 | 0.00287704709984 | 0.003276683469672 | 0.003727156887339 |
| Peak 76 | 0.002877037728107 | 0.002442129907363 | 0.002337646210769 | 0.002788004847388 |

| | Well 1<br>Aug. 7, 2020<br>Level 1 | Well 5<br>Oct. 10, 2019<br>Level 2 | Well 5<br>Oct. 12, 2019<br>Level 2 | Well 7<br>Oct. 12, 2019<br>Level 1 |
|---|---|---|---|---|
| Peak 1 | 0.013370326066942 | 0.006716095367945 | 0.003732497744405 | 0.006051701844096 |
| Peak 2 | 0.013260388816028 | 0.006563729794484 | 0.003287950509176 | 0.005179351247457 |
| Peak 3 | 0.062448532481655 | 0.027206735811963 | 0.014300904617751 | 0.022388033823632 |
| Peak 4 | 0.051485571449531 | 0.027283834821413 | 0.016061866070092 | 0.022150030746897 |
| Peak 5 | 0.080941674989694 | 0.044032853101743 | 0.02762328021599 | 0.037120692248912 |
| Peak 6 | 0.012435744922169 | 0.009980902051181 | 0.009580528476575 | 0.010727814222526 |
| Peak 7 | 0.004455441290783 | 0.003780477830927 | 0.003608233484159 | 0.004022485817319 |
| Peak 8 | 0.011225031981077 | 0.006899158726263 | 0.005004090528317 | 0.006321016938298 |
| Peak 9 | 0.036798945828852 | 0.02817750569683 | 0.020716334872811 | 0.023646495650108 |
| Peak 10 | 0.021618411933556 | 0.017491914721426 | 0.013223682588411 | 0.014805414816104 |
| Peak 11 | 0.066630175567204 | 0.053441794575621 | 0.041989326497255 | 0.047240173743128 |
| Peak 12 | 0.001475876941108 | 0.001623573013528 | 0.001344707428118 | 0.001233892792199 |
| Peak 13 | 0.026803942101399 | 0.020701699862579 | 0.017028610336339 | 0.01965041479402 |
| Peak 14 | 0.003680729538994 | 0.003395019844371 | 0.002820792738719 | 0.002942927417693 |
| Peak 15 | 0.000193860645942 | 0.00018670601278 | 0.000159432734175 | 0.000165779904355 |
| Peak 16 | 0.004492687138526 | 0.003147292986675 | 0.00266915115226 | 0.003006890325163 |
| Peak 17 | 0.000779206756977 | 0.0009524759026 | 0.00084797333831 | 0.000720613986458 |
| Peak 18 | 0.033064315488852 | 0.033823023435931 | 0.029224784821522 | 0.029368279532186 |
| Peak 19 | 0.021041273879489 | 0.022877976716664 | 0.020219184543605 | 0.0193180525458 |
| Peak 20 | 0.005213916876072 | 0.004477293416543 | 0.003959183776345 | 0.004454493211869 |
| Peak 21 | 0.004392766416325 | 0.003667789848547 | 0.003244516935927 | 0.003718205737399 |
| Peak 22 | 0.021193479965474 | 0.022725057291716 | 0.020312082615558 | 0.0196391955083 |
| Peak 23 | 0.00567301472792 | 0.004836815917458 | 0.004349400109038 | 0.004915495313593 |
| Peak 24 | 0.006694438096948 | 0.006030764891486 | 0.005450805924135 | 0.005929233180381 |
| Peak 25 | 0.008231864014116 | 0.00717361210953 | 0.006485875512126 | 0.00721263934334 |
| Peak 26 | 0.055960348910391 | 0.056565749619537 | 0.052202038818908 | 0.053501295824836 |
| Peak 27 | 0.069236369842089 | 0.079939542422825 | 0.074967461352594 | 0.070720498113777 |
| Peak 28 | 0.003233254655708 | 0.002832636162254 | 0.002664898237076 | 0.003009500965875 |
| Peak 29 | 0.004823028918264 | 0.005686563281586 | 0.005415345726867 | 0.004949472217809 |
| Peak 30 | 0.004320289723164 | 0.004816585719808 | 0.004587629767907 | 0.004305507076627 |
| Peak 31 | 0.003326453523184 | 0.003052702976667 | 0.002918527963112 | 0.003230570841094 |
| Peak 32 | 0.000881526096723 | 0.001108090463593 | 0.001060364136055 | 0.000894793186303 |
| Peak 33 | 0.002557541804476 | 0.002342932207688 | 0.002256064974704 | 0.002503333614547 |
| Peak 34 | 0.000326656538018 | 0.000272487107543 | 0.000278790666392 | 0.00029554365536 |
| Peak 35 | 0.021911389263832 | 0.016222429463889 | 0.015695381707741 | 0.017350801163254 |
| Peak 36 | 0.045430188048043 | 0.048583238443113 | 0.04852799760914 | 0.04823125565251 |
| Peak 37 | 0.023023592434219 | 0.027605886901485 | 0.027788445827655 | 0.02627174743156 |
| Peak 38 | 0.02140311791195 | 0.02097907321677 | 0.021500912539463 | 0.022339245742465 |
| Peak 39 | 0.011704810701124 | 0.010847492677289 | 0.01104884003218 | 0.01215075846854 |
| Peak 40 | 0.010511236526519 | 0.01346217119042 | 0.013718374219556 | 0.012154202087272 |
| Peak 41 | 0.042596922600754 | 0.045233108158795 | 0.046657636347021 | 0.046722302508158 |
| Peak 42 | 0.039077621453906 | 0.040705433199093 | 0.042494260858974 | 0.042829156519119 |

TABLE 5-continued

| | | | | |
|---|---|---|---|---|
| Peak 43 | 0.036226298690258 | 0.036397738167065 | 0.038115450056709 | 0.039241679308522 |
| Peak 44 | 0.035523074329697 | 0.035012101811161 | 0.036702887700849 | 0.039556321586792 |
| Peak 45 | 0.008204590117198 | 0.008754681859932 | 0.009147752554783 | 0.009236221416996 |
| Peak 46 | 0.010491039880514 | 0.011122457086351 | 0.011618135756774 | 0.011961647946819 |
| Peak 47 | 0.033663048053335 | 0.032226092943735 | 0.033658843201693 | 0.035648033720894 |
| Peak 48 | 0.008009279258501 | 0.008468495472641 | 0.008852256971979 | 0.009126333815417 |
| Peak 49 | 0.032786792371667 | 0.03050921592629 | 0.031790996373396 | 0.034438794345695 |
| Peak 50 | 0.012768469778537 | 0.012983085948335 | 0.013489073350368 | 0.014090554124046 |
| Peak 51 | 0.030152386019361 | 0.027057342917969 | 0.028278653299506 | 0.031177955020138 |
| Peak 52 | 0.028190878385751 | 0.024742426948013 | 0.025849695602251 | 0.028939776029741 |
| Peak 53 | 0.009684583764905 | 0.009595893734382 | 0.010054779709526 | 0.010754391163782 |
| Peak 54 | 0.0270123220517 | 0.022903816256286 | 0.023838411412296 | 0.027337685656093 |
| Peak 55 | 0.012118358948942 | 0.011091446344521 | 0.011419405358967 | 0.013070332449572 |
| Peak 56 | 0.022683961685974 | 0.019380828305284 | 0.020168391083023 | 0.023049346445316 |
| Peak 57 | 0.010492758787511 | 0.010697342097989 | 0.011067024120319 | 0.011591070370768 |
| Peak 58 | 0.020879894563917 | 0.017723276400099 | 0.018473713284341 | 0.021364019346683 |
| Peak 59 | 0.020054343162414 | 0.016969586237686 | 0.017667518048624 | 0.020411206609347 |
| Peak 60 | 0.016480391160924 | 0.013206587053752 | 0.013898303878263 | 0.016753764870582 |
| Peak 61 | 0.015924474226339 | 0.012831032508277 | 0.013779317913068 | 0.015367561665687 |
| Peak 62 | 0.015036877357437 | 0.011556799775804 | 0.012254680430954 | 0.014605088625066 |
| Peak 63 | 0.012909913780859 | 0.010005508293255 | 0.010926656178348 | 0.01306930699858 |
| Peak 64 | 0.010641447719041 | 0.008751322513888 | 0.008865146953505 | 0.010604182282705 |
| Peak 65 | 0.009781012279909 | 0.008187632236406 | 0.008195790914164 | 0.009887073795643 |
| Peak 66 | 0.008731835699425 | 0.007322529391281 | 0.007243399199029 | 0.00869829481977 |
| Peak 67 | 0.008414970755824 | 0.006933163560405 | 0.007177972136801 | 0.008293886201065 |
| Peak 68 | 0.008026529674192 | 0.006534920457894 | 0.006708877054576 | 0.007522711694441 |
| Peak 69 | 0.00679370691866 | 0.005847820950961 | 0.005676478039592 | 0.007233063578642 |
| Peak 70 | 0.006628201081175 | 0.005614767657487 | 0.005312230222841 | 0.006443910730207 |
| Peak 71 | 0.006191664139275 | 0.005598023635812 | 0.004991620343792 | 0.006126133031054 |
| Peak 72 | 0.005361737152246 | 0.004804083912271 | 0.004374847633975 | 0.005491316182482 |
| Peak 73 | 0.00500400328284 | 0.004464956323203 | 0.004215780542197 | 0.004790466638799 |
| Peak 74 | 0.004423177942195 | 0.003891414901396 | 0.004060877030271 | 0.004151539949809 |
| Peak 75 | 0.004104855424351 | 0.002724486467781 | 0.003641086749961 | 0.003778173725682 |
| Peak 76 | 0.003559939003784 | 0.002636224365428 | 0.002827056094151 | 0.002869115841013 |

The invention claimed is:

1. A computer-implemented method for determining the provenance of a sample comprising a mixture of hydrocarbons obtained from production of a well, the method comprising the steps of:
  a) collecting a plurality of pure samples from different geological levels in the well, wherein each of said pure samples comprises a mixture of hydrocarbons representative of a corresponding geological level;
  b) determining a value of a property in each of the pure samples collected in step a), wherein determining the value of the property in each of the pure samples collected in step a) comprises subjecting each of the pure samples to a gas chromatography analysis;
  c) determining a value of the property in the sample, wherein determining the value of the property in the sample comprises subjecting the sample to a gas chromatography analysis; and
  d) calculating a contribution of each geological level to the sample, by solving a system of equations relating the values of the property in each of the pure samples collected in step a) determined in step b) to the value of the property in the sample determined in step c) using linear discriminant analysis,
  wherein both the sample and the pure samples are obtained from one of produced oil, co-produced gas or co-produced water.

2. The method of claim 1, wherein the linear discriminant analysis comprises calculating a set of eigenvalues and eigenvectors generating a hyperplane wherein the ratio of intra covariances and inter covariances is maximal.

3. The method of claim 2, wherein the intra covariance matrix and the inter covariance matrix are respectively defined by the following equations:

$$\Sigma_b = \sum_{k=1}^{K}(\mu_k - \mu)N_k(\mu_k - \mu)^T$$

$$\Sigma_w = \sum_{k=1}^{K}\sum_{n=1}^{N_k}(X_n^{(k)} - \mu_k)(X_n^{(k)} - \mu_k)^T$$

and the eigenvectors are defined by the following equation:

$$\Sigma_w^{-1}\Sigma_b w = \lambda w.$$

4. The method of claim 3, wherein solving the system of equations comprises maximizing a cost function.

5. The method of claim 4, wherein the cost function is defined by the following equation:

$$J(w) = w \cdot \Sigma_b \cdot w^T / w \cdot \Sigma_w \cdot w^T.$$

6. The method of claim 5, wherein maximizing the cost function comprises solving the following equation:

$$\Sigma_w^{-1}\Sigma_b w = (w \cdot \Sigma_b \cdot w^T / w \cdot \Sigma_w \cdot w^T)w.$$

7. A computer-implemented method for determining the provenance of a sample comprising a mixture of hydrocarbons obtained from production of a well, the method comprising the steps of:
  e) collecting a plurality of pure samples from different geological levels in the well, wherein each of said pure samples comprises a mixture of hydrocarbons representative of a corresponding geological level,
  f) determining a value of a property in each of the pure samples collected in step a), wherein determining the value of the property in each of the pure samples collected in step a) comprises subjecting each of the pure samples to a gas chromatography analysis, g) determining a value of the property in the sample, wherein determining the value of the property in the sample comprises subjecting the sample to a gas chromatography analysis, and h) calculating a contribution of each geological level to the sample, by solving a system of equations relating the values of the property in each of the pure samples collected in step a) determined in step b) to the value of the property in the sample determined in step c) using maximum likelihood estimation, wherein both the sample and the pure samples are obtained from one of produced oil, co-produced gas or co-produced water.

8. A non-transitory computer-readable medium encoded with instructions that, when executed, perform operations for determining the provenance of a sample comprising a mixture of hydrocarbons obtained from production of a well, the operations comprising:

a) collecting a plurality of pure samples from different geological levels in the well, wherein each of said pure samples comprises a mixture of hydrocarbons representative of a corresponding geological level;

b) determining a value of a property in each of the pure samples collected in step a), wherein determining the value of the property in each of the pure samples collected in step a) comprises subjecting each of the pure samples to a gas chromatography analysis;

c) determining a value of the property in the sample, wherein determining the value of the property in the sample comprises subjecting the sample to a gas chromatography analysis; and d) calculating a contribution of each geological level to the sample, by solving a system of equations relating the values of the property in each of the pure samples collected in step a) determined in step b) to the value of the property in the sample determined in step c) using linear discriminant analysis, wherein both the sample and the pure samples are obtained from one of produced oil, co-produced gas or co-produced water.

9. A non-transitory computer-readable medium encoded with instructions that, when executed, perform operations for determining the provenance of a sample comprising a mixture of hydrocarbons obtained from production of a well, the operations comprising:

a) collecting a plurality of pure samples from different geological levels in the well, wherein each of said pure samples comprises a mixture of hydrocarbons representative of a corresponding geological level;

b) determining a value of a property in each of the pure samples collected in step a), wherein determining the value of the property in each of the pure samples collected in step a) comprises subjecting each of the pure samples to a gas chromatography analysis;

c) determining a value of the property in the sample, wherein determining the value of the property in the sample comprises subjecting the sample to a gas chromatography analysis; and d) calculating a contribution of each geological level to the sample, by solving a system of equations relating the values of the property in each of the pure samples collected in step a) determined in step b) to the value of the property in the sample determined in step c) using maximum likelihood estimation, wherein both the sample and the pure samples are obtained from one of produced oil, co-produced gas or co-produced water.

\* \* \* \* \*